United States Patent [19]

Chappuis

[11] Patent Number: 4,823,435

[45] Date of Patent: Apr. 25, 1989

[54] MULTIPART HANDLE FOR A SANITARY TAP

[75] Inventor: John Chappuis, Archamps, France

[73] Assignee: Kugler, Fonderie et Robinetterie SA, Geneva, Switzerland

[21] Appl. No.: 227,154

[22] Filed: Aug. 2, 1988

[30] Foreign Application Priority Data

Sep. 15, 1987 [CH] Switzerland ............................ 3550/87

[51] Int. Cl.$^4$ ................................................ B25G 1/10
[52] U.S. Cl. ................................. 16/121; 16/DIG. 30; 74/553; 251/291
[58] Field of Search ......................... 16/121, DIG. 30; 251/291, 293; 74/548, 553

[56] References Cited

U.S. PATENT DOCUMENTS

| | | | |
|---|---|---|---|
| 3,396,604 | 8/1968 | Samuels et al. | 16/DIG. 30 X |
| 4,565,350 | 1/1986 | Rozek | 16/121 X |
| 4,593,430 | 6/1986 | Spangler et al. | 16/121 |

FOREIGN PATENT DOCUMENTS

| | | |
|---|---|---|
| 1272064 | 7/1968 | Fed. Rep. of Germany . |
| 1775372 | 5/1971 | Fed. Rep. of Germany . |
| 3143747 | 5/1983 | Fed. Rep. of Germany . |
| 1395725 | 3/1965 | France . |
| 1504757 | 12/1967 | France . |
| 2311975 | 12/1976 | France . |
| WO87/00255 | 1/1987 | Int'l Pat. Institute . |

Primary Examiner—Fred A. Silverberg
Attorney, Agent, or Firm—Young & Thompson

[57] ABSTRACT

The handle for sanitary apparatus is intended to be fixed by clipsing on the free end of a control shaft and comprises a thin metallic envelope (1) defining the outside shape and appearance of the handle, a supple insert (2) comprising a dome (9) to which are attached several deformable flaps (11), the lower flange of said flaps cooperating in service position, with a flange (7) of the envelope, and a lock (3) comprising parts applying the flaps of the supple insert against the inside face of the envelope, a lower edge resting on the flange of the envelope. A mounting mechanism is provided on the inside face of the supple insert and the outside face of the lock permitting through their cooperation the assembly of the three parts in assembled service position.

4 Claims, 3 Drawing Sheets

MULTIPART HANDLE FOR A SANITARY TAP

The present invention has for its object a handle for a sanitary apparatus or tap of the type being fitted and clipsed on the end of the control shaft of the tap.

For numerous applications it is necessary to be able to realize handles the outer part of which is metallic, painted, or having been submitted to any other surface treatment. There are solid metal handles but their weight, and above all their cost, is excessive. That is why handles have been developed which comprise a central part moulded in plastic material or injected on which a thin metallic envelope is slid on. This thin envelope is then deformed to be definitively fixed to the central plastic part. Such handles have the drawback that the surface treatment of the metallic envelope can only be terminated after said envelope has been fixed to the central plastic part. According to the desired surface treatment this causes problems particularly relating to the resistance of the central part to temperature.

To avoid these drawbacks it has been proposed, CH patent 657.197, a handle the metallic envelope of which is glued by means of a synthetic resin poured between the central plastic part and this envelope. This gluing is difficult to realize in good conditions and necessitates a relatively long time depending on the solidification time of the mass of synthetical resin.

The present invention has for its object a sanitary tap handle comprising a metallic envelope obviating to the precited drawbacks in that it can be terminated, including its surface treatment, before being assembled to the driver intended to be coupled to the control shaft of the tap and which further needs no gluing nor welding for its fixing to said driver.

The attached drawing shows schematically and by way of example one embodiment of the handle according to the invention.

Figure 1:
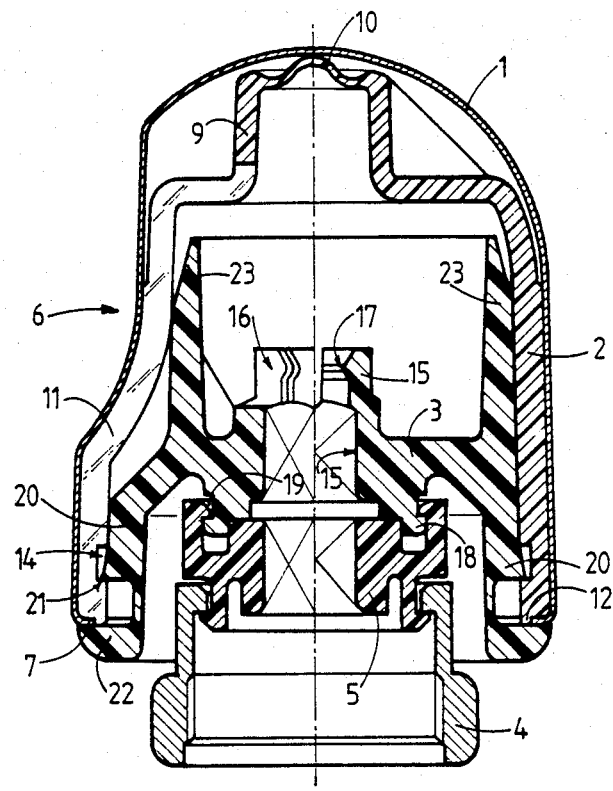
FIG. 1 is an axial crosssection of the handle.

The handle according to the invention is constituted of three base parts, the envelope made in metal 1, a supple insert 2 and a lock 3, these two latters parts being made in moulded or injected supple, respectively hard synthetical material.

Each of these three parts can be completely terminated, including its surface finish, and stored separately before assembly. This assembly is done solely by mechanical fitting and mounting; in the example shown, the handle comprises further two supplemental parts a nut 4 in metal and a connecting part 5 in plastic material enabling to fix the assembly of the three others parts 1,2 and 3 on the control shaft of a tap (not shown) in a non removable manner; embodiment particularly intended for public locations in order to avoid thefts of the handles. It is evident that the handle can be manufactured in a variant without nut 4 and without connecting part 5.

Figure 2:
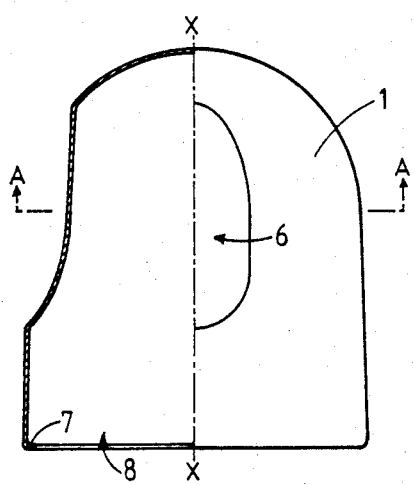
FIG. 2 is a view partially in elevation and partially in crosssection of the metallic envelope of the handle.
Figure 3:
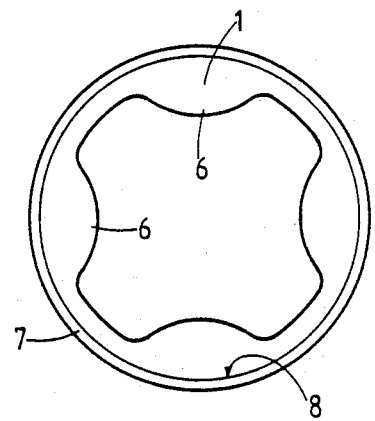
FIG. 3 is a view from underneath of the envelope of the handle.
Figure 4:
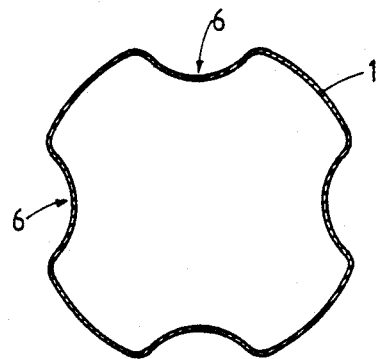
FIG. 4 is a crosssection along line A—A of FIG. 2.

The envelope 1 of the handle (FIGS. 2 to 4) is made by a metallic cap of low thickness having a shape such as one desires to give to the outside of the handle. It can be provided with recesses 6 permitting a good grasping of the handle. This metallic cap comprises a flange 7 located in a plan substantially perpendicular to its symetry axis X—X defining its opening 8.

This thin envelope is light and easy to manufacture and can be completely terminated before assembly. It can particularly be submitted to any desired surface treatment, painting, galvanic or chemical treatment, broaching, marking etc., and be stored in its terminated state before assembly with the supple insert 2 and the lock 3.

Figure 5:
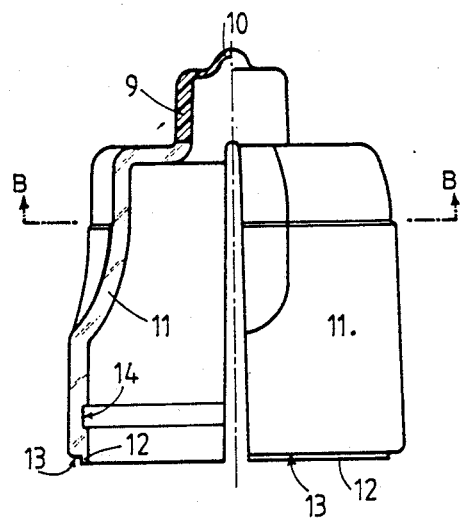
FIG. 5 is a view partially in elevation and partially in crosssection of a supple insert of the handle.
Figure 6:
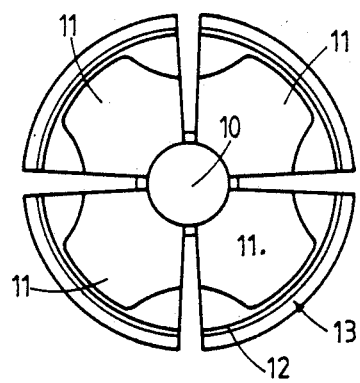
FIG. 6 is a view from underneath of the supple insert.

The supple insert (FIGS. 5 to 7) comprises an upper cylindrical dome 9 the upper wall 10 of which is deformable against its own resilliency. This dome 9 is used as attachment point for several flaps 11, four in the embodiment shown, separated by slots and having on a portion of their height at least an external shape corresponding to the inside shape of the envelope 1. The lower end of the flaps 11 is provided with an edge 12 of a height substantially equal to the width of the envelope 1, freeing thus a portion 13 intended to be, in service position, applied against the internal lower end of the envelope.

This supple insert 2 comprises further an annular groove 14 in each of its flaps 11.

The dimensions of this supple insert 2 are such that it can be introduced into the envelope 1, the lower edge 12 of the flaps 11 fitting in the opening 8 of the envelope and the upper wall 10 entering into contact with the envelope 1. In its service position this supple insert is applied against the lateral walls of the envelope by the lock 3.

This lock 3 comprises a central portion 15 provided with a square 15 intended to receive the square of the control shaft of a tap. The summit of this central portion 15 has slots 16 to give a certain own elasticity, as well as retaining means 17 intended to cooperate in service position mounted onto the control shaft of a tap with a groove of the end of said shaft.

The lower portion of said central portion 15 has an internal skirt 18 provided with an annular groove 19 turned outwardly.

This lock has further an outside lower cylindrical skirt 20 having a circular prong 21 cooperating in service position with the grooves 17 of the flaps 11 of the supple insert.

The lower end of said skirt 20 is provided with a flange 22 clamping, in service position, the flange 7 of the envelope 1 against the portions 13 of the flaps 11 of the supple insert. In service assembled position the outside lower skirt 20 applies the flaps 11 against the internal face of the envelope.

Figure 7:
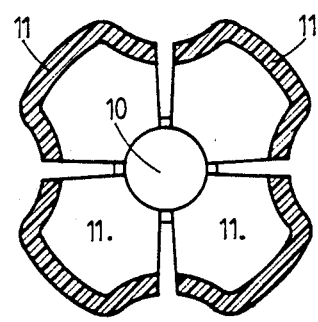
FIG. 7 is a crosssection along line B—B of FIG. 5.
Figure 8:
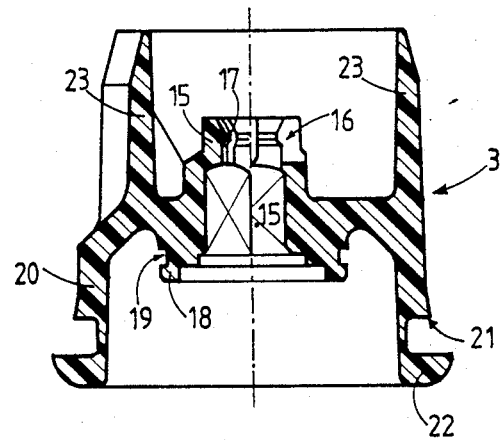
FIGS. 8 and 9 are views in axial crosssection respectively from underneath of a lock.
Figure 9:
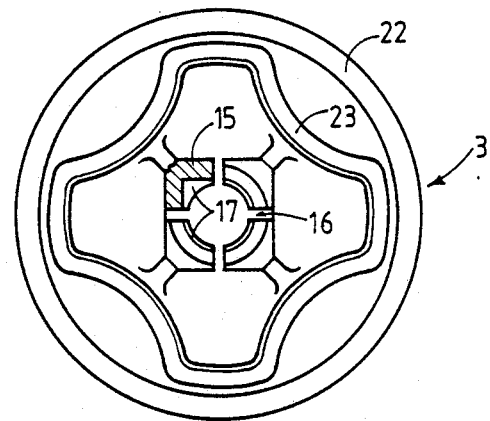

This lock 3 comprises further an upper skirt 23 the shape of which corresponds to the one of the flaps at the level of the crosssection shown at FIG. 7, enables in service position to apply the upper portion of said flaps 11 agains the envelope 1.

Therefore, the assembly of these three parts is made by simple fitting and mechanical mounting, causing no alteration of their finish and particularly of the surface of the envelope. This assembly is simple, quick and secure.

In the embodiment shown the handle comprises further a nut 4 screwed on the head (not shown) of a tap and a connecting part 5 mounted on the one hand onto said nut 4 and on the other hand on the lower internal skirt 18 of the lock 3 in order to avoid any extraction of the handle once having been mounted.

I claim:

1. Handle for sanitary apparatus intended to be fixed by mounting onto the free end of a control shaft, characterized by the fact that it comprises a metallic thin envelope defining the outside shape and the appearance of the handle, said envelope having a lower flange; a supple insert mounted inside the envelope comprising a dome to which several deformable flaps are attached, the lower edge of said flaps cooperating in a service position with the flange of the envelope, and a lock mounted inside the supply insert comprising portions applying the flaps of the supple insert directly against the internal surface of the envelope, the lower flange of the envelope resting on a lower flange of the lock, and by the fact that coupling means are provided on the inside surface of the lock enabling through their cooperation with each other the assembly of the three parts in assembled service position.

2. Handle according to claim 1, characterized by the fact that the upper wall of the dome of the supple insert is resilliently deformable and enters in contact with the inside face of the envelope, and by the fact that the lower edge of this supple insert is also resilliently deformable.

3. Handle according to claim 1, characterized by the fact that the lock is mounted onto the end of the control shaft.

4. Handle according to claim 1, characterized by the fact that the lock comprises an outside lower skirt mounted onto a connecting part itself intended to be screwed onto the head of a tap.

* * * * *